United States Patent
Roh

(10) Patent No.: US 10,783,081 B2
(45) Date of Patent: Sep. 22, 2020

(54) METHOD FOR CONTROLLING NEAR CACHES IN DISTRIBUTED CACHE ENVIRONMENT, AND DISTRIBUTED CACHE SERVER USING THE SAME

(71) Applicant: TMAXSOFT. CO., LTD., Gyeonggi-do (KR)

(72) Inventor: Cliff Roh, Gyeonggi-do (KR)

(73) Assignee: TMAXSOFT. CO., LTD., Gyeonggi-do (KR)

( * ) Notice: Subject to any disclaimer, the term of this patent is extended or adjusted under 35 U.S.C. 154(b) by 44 days.

(21) Appl. No.: 16/011,976

(22) Filed: Jun. 19, 2018

(65) Prior Publication Data

US 2019/0377682 A1  Dec. 12, 2019

(30) Foreign Application Priority Data

Jun. 7, 2018 (KR) .................. 10-2018-0065707

(51) Int. Cl.
*G06F 12/0873* (2016.01)
*G06F 12/0893* (2016.01)

(52) U.S. Cl.
CPC ...... *G06F 12/0873* (2013.01); *G06F 12/0893* (2013.01); *G06F 2212/284* (2013.01); *G06F 2212/314* (2013.01); *G06F 2212/608* (2013.01); *G06F 2212/7204* (2013.01)

(58) Field of Classification Search
CPC .............. G06F 12/084; G06F 12/0811; G06F 12/0891; G06F 2212/621; G06F 12/0808; G06F 2212/651; G06F 3/065; G06F 15/17331; G06F 2212/251; G06F 2212/1016; G06F 12/0815; G06F 12/0871; G06F 12/0873; G06F 16/24552; G06F 16/27; G06F 2212/608; G06F 2212/154; G06F 12/0893; G06F 2212/163;
(Continued)

(56) References Cited

U.S. PATENT DOCUMENTS

| | | | |
|---|---|---|---|
| 2012/0317370 A1* | 12/2012 | Luna ................ | H04L 67/1095 711/146 |
| 2014/0089260 A1* | 3/2014 | Amrhein .......... | G06F 9/45504 707/615 |
| 2017/0039145 A1* | 2/2017 | Wu ................... | G06F 12/0813 |

FOREIGN PATENT DOCUMENTS

| KR | 100791628 B1 | 12/2007 |
|---|---|---|
| KR | 101218828 B1 | 12/2012 |
| KR | 10-2015-0103477 A | 9/2015 |

* cited by examiner

*Primary Examiner* — Hashem Farrokh
(74) *Attorney, Agent, or Firm* — Husch Blackwell LLP

(57) ABSTRACT

A method controlling near caches in a distributed cache environment including distributed cache servers is provided. The method includes steps of: a specific distributed cache server among the distributed cache servers, if a request signal for original cache data is obtained from a client node, transmitting replicated cache data for the original cache data to the client node, to support the client node to store and refer to the replicated cache data in its corresponding near cache storage part, and managing a reference map with a correspondence between the client node referring to the replicated cache data, and the original cache data; and if the original cache data is changed, checking the number of the client nodes referring to the replicated cache data by referring to the reference map, and invalidating the replicated cache data according to the number of the checked client nodes.

18 Claims, 4 Drawing Sheets

(58) Field of Classification Search
CPC ......... G06F 2212/284; G06F 2212/285; G06F 2212/314; G06F 2212/7204
USPC ........................................................ 711/119
See application file for complete search history.

METHOD FOR CONTROLLING NEAR CACHES IN DISTRIBUTED CACHE ENVIRONMENT, AND DISTRIBUTED CACHE SERVER USING THE SAME

CROSS REFERENCE TO RELATED APPLICATION

This application claims priority to and incorporates herein by reference all disclosure in Korean patent application no. 10-2018-0065707 filed Jun. 7, 2018.

FIELD OF THE INVENTION

The present invention relates to a method for controlling one or more near caches in a distributed cache environment; and more particularly, to the method for controlling the near caches in the distributed cache environment which includes a plurality of distributed cache servers, including steps of (a) a specific distributed cache server among the plurality of distributed cache servers, if a request signal for original cache data is obtained from one or more client nodes, (i) transmitting replicated cache data for the original cache data to the one or more client nodes, to thereby support the one or more client nodes to store and refer to the replicated cache data in its corresponding near cache storage part, and (ii) generating or updating or supporting another device to generate or update a reference map which has mapping information between the one or more client nodes referring to the replicated cache data and the original cache data, (b) the specific distributed cache server monitoring or supporting another device to monitor a changed state of the original cache data included in the reference map, to thereby check a validity of the replicated cache data, and (c) the specific distributed cache server, if the replicated cache data is determined as not valid, checking or supporting another device to check the number of the client nodes currently referring to the replicated cache data by referring to the reference map, and invalidating or supporting another device to invalidate the replicated cache data according to the number of the checked client nodes, and the distributed cache server using the same.

BACKGROUND OF THE INVENTION

Along with the growth of social media such as Facebook, YouTube and Twitter and wide distribution of digital devices such as a mobile device, a user is no more a simple data consumer but plays a role of a data producer. As such, the amount of data has rapidly increased and the types of data have become diversified, which has led us to a big data era. In order to process such big data, distributed storage management technologies such as Hadoop and parallel database management system (DBMS) are currently utilized.

In general, the distributed storage management technologies are required to store and process data in storages. Hence, costs due to input/output (I/O) low speed may increase and bottlenecks may be created in the nodes. In order to solve these problems, distributed cache technologies of storing cache data in a plurality of distributed cache servers are currently used as a means for providing reliable, low-cost data storing scheme in cloud infrastructure.

Herein, obtaining cache data from a cache server holding up-to-date data and utilizing the obtained cache data may be the most basic principle. In many cases, cache data have a read-only attribute that no change is made for a long time, and once the cache data in the cache server is referred to from a client node, the cache data can be copied to the client node and then the copied cache data can be referred to by the client node per se, which reduces unnecessary network communications, thereby significantly contributing the performance improvement.

In order to achieve such efficiency, technologies of controlling near caches are currently introduced, and accordingly, a near cache storage space is provided to a client node and details of change in the cache data are monitored, to thereby check a validity of the near cache. Namely, if the cache data in the near cache storage part is determined as not valid any more due to a change in the cache data in the cache server, information on the change therein may be provided to all client nodes which is referring to the cache data in order to instruct the client nodes to refer to new cache data in the cache server.

The near cache mechanism provides many advantages of preventing unnecessary waste of network resources and reducing the amount of workload of the cache server by minimizing the number of approaches to the cache server, but in case the cache data in the cache server are changed more frequently than a certain level or in case there are many client nodes which copy the cache data in the near cache storage part therein, there may be problems such as a problem of synchronization and a problem of excessively using network resources required to invalidate the cache data and replace the cache data with the new cache data.

SUMMARY OF THE INVENTION

It is an object of the present invention to solve all the aforementioned problems.

It is another object of the present invention to minimize excessive use of network resources when cache data are referred to.

It is still another object of the present invention to efficiently invalidate the cache data in a distributed cache environment.

It is still yet another object of the present invention to prevent a rapid increase in the use of network resources required to invalidate the cache data in the distributed cache environment.

It is still yet another object of the present invention to efficiently manage client nodes referring to the cache data in the distributed cache environment.

In accordance with one aspect of the present invention, there is provided a method for controlling one or more near caches in a distributed cache environment which includes a plurality of distributed cache servers, including steps of: (a) a specific distributed cache server among the plurality of distributed cache servers, if a request signal for original cache data is obtained from at least one client node, (i) transmitting replicated cache data for the original cache data to the at least one client node, to thereby support the at least one client node to store and refer to the replicated cache data in its corresponding near cache storage part, and (ii) generating or updating or supporting another device to generate or update a reference map which has mapping information between the at least one client node referring to the replicated cache data and the original cache data; (b) the specific distributed cache server monitoring or supporting another device to monitor a changed state of the original cache data included in the reference map, to thereby check a validity of the replicated cache data; and (c) the specific distributed cache server, if the replicated cache data is determined as not valid, checking or supporting another device to check the number of the client nodes currently referring to the replicated cache data by referring to the reference map, and invalidating or supporting another device to invalidate the replicated cache data according to the number of the checked client nodes.

In accordance with another aspect of the present invention, there is provided a specific distributed cache server for controlling one or more near caches in a distributed cache environment which includes a plurality of distributed cache servers, including: a communication part for obtaining a request signal for original cache data received from at least one client node; and a processor for performing processes of (I) (i) transmitting replicated cache data for the original cache data to the at least one client node, to thereby support the at least one client node to store and refer to the replicated cache data in its corresponding near cache storage part, and (ii) generating or updating or supporting another device to generate or update a reference map which has mapping information between the at least one client node referring to the replicated cache data and the original cache data; (II) monitoring or supporting another device to monitor a changed state of the original cache data included in the reference map, to thereby check a validity of the replicated cache data; and (III) if the replicated cache data is determined as not valid, checking or supporting another device to check the number of the client nodes currently referring to the replicated cache data by referring to the reference map, and performing or supporting another device to invalidate the replicated cache data according to the number of the checked client nodes.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
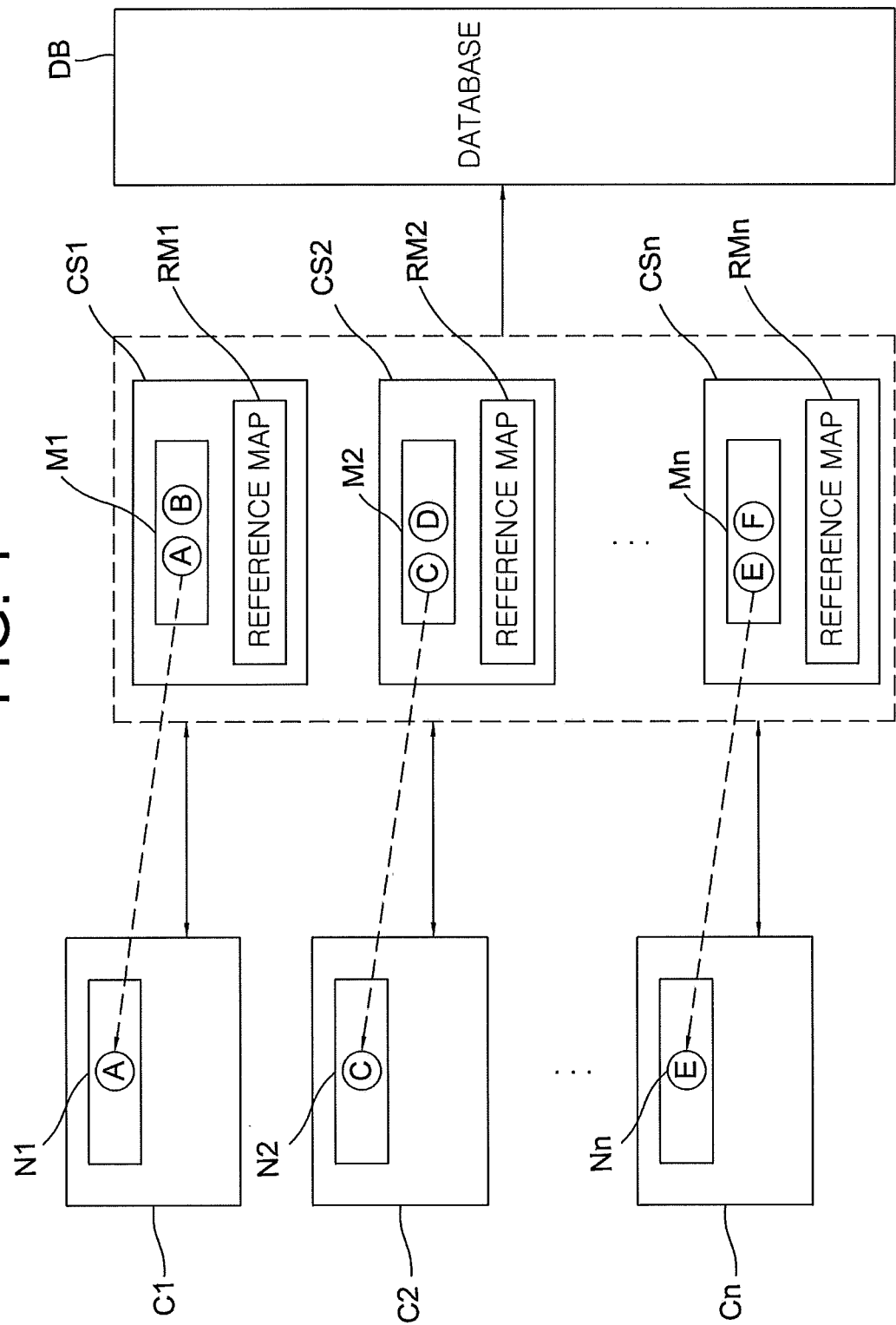
FIG. 1 is a diagram schematically illustrating a distributed cache system for managing near caches in a distributed cache environment in accordance with one example embodiment of the present invention.

Detailed explanation on the present invention to be made below refer to attached drawings and diagrams illustrated as specific embodiment examples under which the present invention may be implemented to make clear of purposes, technical solutions, and advantages of the present invention. These embodiments are described in sufficient detail to enable those skilled in the art to practice the invention.

In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To make it easy for those who have common knowledge in the art to which the present invention pertains to implement the present invention, detailed explanation on desirable embodiment examples of the present invention will be made by referring to attached drawings.

FIG. 1 is a diagram schematically illustrating a distributed cache system for managing near caches in a distributed cache environment in accordance with one example embodiment of the present invention, and the distributed cache system may include a plurality of distributed cache servers CS1, CS2, . . . , CSm.

Each of the plurality of distributed cache servers CS1, CS2, . . . , CSm stores original cache data corresponding to data stored in a database in main cache storage parts M1, M2, . . . , Mm, and if a request signal for a specific original cache data is received from one or more client nodes C1, C2, . . . , Cn, a specific distributed cache server currently storing the specific original cache data among the plurality of distributed cache servers CS1, CS2, . . . , CSm transmits replicated cache data for the specific original cache data to the one or more client nodes C1, C2, . . . , Cn so that the one or more client nodes C1, C2, . . . , Cn having received the replicated cache data can store the replicated cache data in near cache storage parts N1, N2, . . . , Nn, to thereby allow the one or more client nodes C1, C2, . . . , Cn to use the replicated cache data stored in the near cache storage parts N1, N2, . . . , Nn without having to refer to the specific original cache data in the specific distributed cache server.

Also, each of the plurality of distributed cache servers CS1, CS2, . . . , CSm generates or updates each corresponding reference map which has mapping information between the one or more client nodes C1, C2, . . . , Cn referring to replicated cache data and the original cache data. Further, the distributed cache servers monitor changes in the original cache data and if there is a change in a particular original cache data, a particular distributed cache server determines that replicated cache data, corresponding to the particular original cache data, stored in the near cache storage parts N1, N2, . . . , Nn of the one or more client nodes C1, C2, . . . , Cn is not valid and invalidates the replicated cache data according to the number of the client nodes C1, C2, . . . , Cn currently referring to the replicated cache data.

Figure 2:
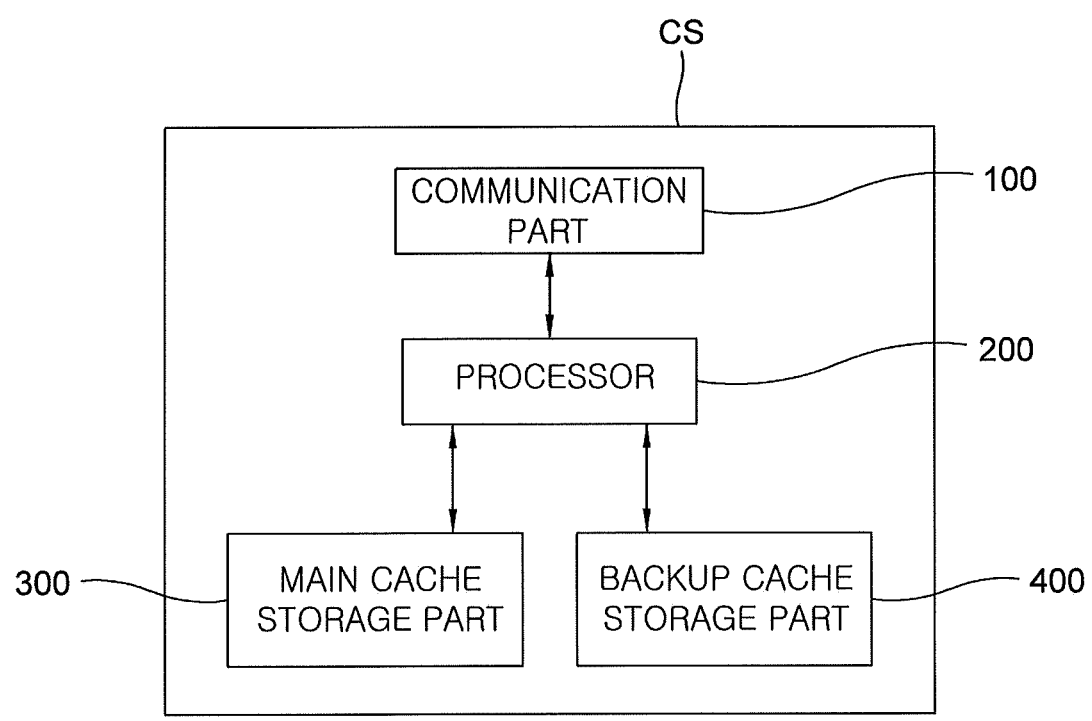
FIG. 2 is a diagram schematically illustrating a distributed cache server which controls the near caches in the distributed cache environment in accordance with one example embodiment of the present invention.

Herein, by referring to FIG. 2, a distributed cache server CS may include a communication part 100 capable of allowing various data to be transmitted or received and a processor 200 capable of allowing the various data to be processed. Further, the distributed cache server CS may include a main cache storage part 300 which stores original cache data corresponding to data stored in a database. In addition, the distributed cache server CS may include a backup cache storage part 400 which stores backup cache data corresponding to another original cache data stored in another main cache storage part in another distributed cache server and when an error occurs in said another distributed cache server, the backup cache data stored in the backup cache storage part 400 may be used.

Figure 3:
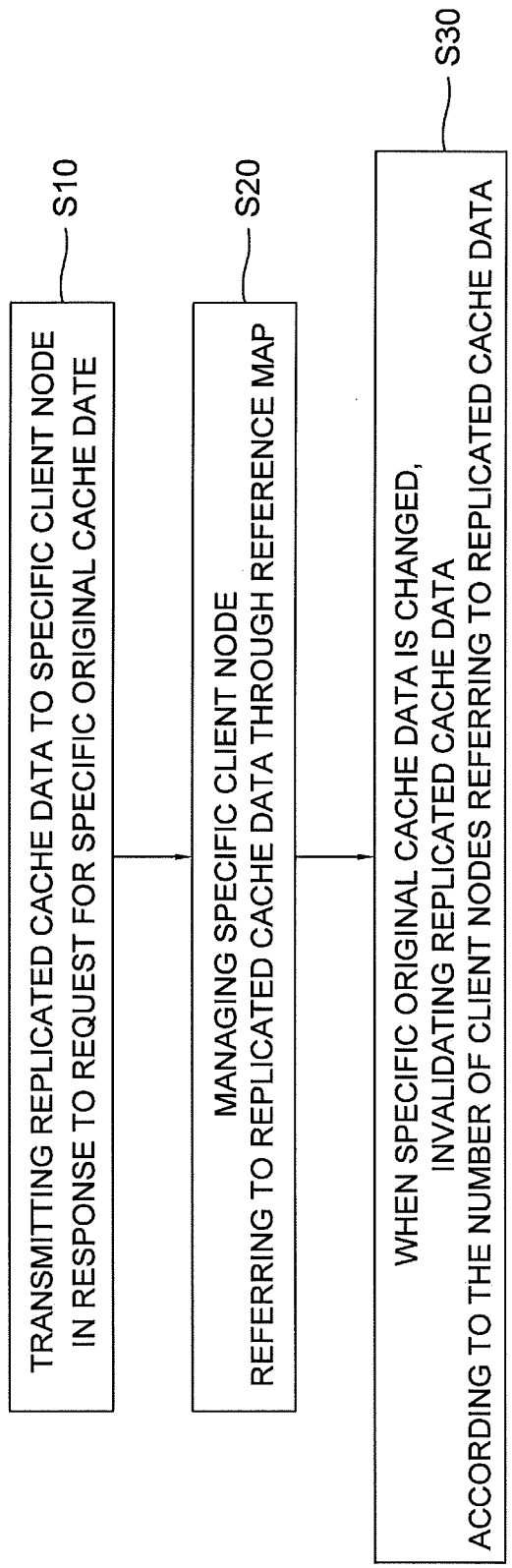
FIG. 3 is a diagram schematically illustrating a method of controlling the near caches in the distributed cache environment in accordance with one example embodiment of the present invention.

A method of controlling the near caches in such a distributed cache system will be described in detail below with reference to FIGS. 1 to 3.

First, the specific distributed cache server transmits the replicated cache data corresponding to the specific original cache data to a specific client node in response to a request for the specific original cache data from the specific client node at a step of S10.

For example, on condition that a specific distributed cache server CS1 stores, in a main cache storage part M1, a specific original cache data Ⓐ corresponding to specific data stored in the database DB, if a request signal for the specific original cache data is received from at least one client node C1, the specific distributed cache server CS1 transmits replicated cache data Ⓐ for the original cache data Ⓐ stored in the main cache storage part M1 to the client node C1. Herein, the client node C1 may include a web application server (WAS), a server in which Java enterprise edition (EE) is installed, and the like but the present invention is not limited thereto. For another example, the client node C1 may include terminals which use data stored in the database by using program application such as Java. Further, the specific distributed cache server CS1 may be a distributed cache server storing the original cache data Ⓐ in the main cache storage part M1. As another example, the specific distributed cache server CS1 may back up, in the backup cache storage part, said another original cache data stored in said another main cache storage part of said another distributed cache server so that when an error occurs in said another distributed cache server, client nodes can use the backup cache data for said another original cache data through the specific distributed cache server CS1.

Meanwhile, the client node C1 stores the replicated cache data transmitted from the specific distributed cache server CS1 in the near cache storage part N1. Thereafter, the client node C1 does not need to connect to the specific distributed cache server CS1 even if the client node C1 needs to access the specific original cache data Ⓐ because the client node C1 can refer to the replicated cache data Ⓐ stored in the near cache storage part N1.

It was explained above that only the client node C1 stores, in the near cache storage part N1, the replicated cache data Ⓐ for the specific original cache data Ⓐ stored in the specific distributed cache server CS1, but the specific distributed cache server CS1 may also transmit the replicated cache data Ⓐ to some client nodes, selected among the client nodes C2, ..., Cn, capable of executing at least one application which requires the specific original cache data Ⓐ, to thereby allow said some client nodes to store the replicated cache data Ⓐ in respective near cache storage parts N2, ..., Nn.

Further, it was only explained about the distributed cache server CS1, but other distributed cache servers CS2, ..., CSm may also transmit replicated cache data for the original cache data Ⓒ Ⓓ or Ⓔ Ⓕ to the client nodes so that the client nodes may store the replicated cache data in the respective near cache storage parts.

Further, each of the client nodes C1, C2, ..., Cn may restrict the entire storage capacity of each of the near cache storage parts in which replicated data are stored. Namely, each of storage capacities of the near cache storage parts N1, N2, ..., Nn of the client nodes C1, C2, ..., Cn is limited, and thus each total amount of the replicated cache data to be stored in each of the near cache storage parts N1, N2, ..., Nn may be restricted. Further, each of the client nodes C1, C2, ..., Cn may restrict the number of the replicated cache data stored in each of the near cache storage parts N1, N2, ..., Nn. As such, each of the client nodes C1, C2, ..., Cn may optimize each of the near cache storage parts N1, N2, ..., Nn with its limited capacity.

Herein, each of the client nodes C1, C2, ..., Cn may apply expiration policy for the replicated cache data stored in each of the near cache storage parts N1, N2, ..., Nn in order to restrict each of the storage capacities of each of the near cache storage parts N1, N2, ..., N1 or the number of entries of the replicated cache data. For example, each of the client nodes C1, C2, ..., Cn may delete at least one of replicated cache data having been referred to at the oldest point of time, replicated cache data having been stored for the longest time, replicated cache data with the smallest capacity, and replicated cache data with the largest capacity, in order to restrict the entire storage capacity or restrict the number of the replicated cache data.

Next, the specific distributed cache server manages the specific client node referring to the replicated cache data through a reference map at a step of S20.

For example, the specific distributed cache server CS1 generates a reference map RM1 which has mapping information between the at least one client node C1 referring to replicated cache data Ⓐ stored in the near cache storage part N1 and the original cache data or updates the already generated reference map RM1. Further, the same method may be applied to other original cache data Ⓑ, Ⓒ, Ⓓ, Ⓔ, Ⓕ and other distributed cache servers CS2, ..., CSm. That is, client nodes referring to replicated cache data corresponding to said other original cache data Ⓑ, Ⓒ, Ⓓ, Ⓔ, Ⓕ may be managed through reference maps RM2, ..., RMm.

Next, if the specific original cache data in the specific distributed cache server is changed, the specific distributed cache server invalidates the replicated cache data. In detail, the specific distributed cache server determines an invalidating scheme according to the number of client nodes referring to the replicated cache data at a step of S30.

For example, the specific distributed cache server CS1 monitors the changed state of the original cache data Ⓐ included in the reference map RM1 to thereby check a validity of the replicated cache data Ⓐ. Namely, if the original cache data Ⓐ stored in the main cache storage part M1 is changed, the replicated cache data Ⓐ stored in the near cache storage part N1 of the client node C1 does not coincide with the changed original cache data Ⓐ, and thus the specific distributed cache server CS1 determines that the replicated cache data Ⓐ is no longer valid. Further, if the replicated cache data is determined as not valid, the specific distributed cache server CS1 checks the number of client nodes having the replicated cache data Ⓐ in their corresponding near cache storage parts by referring to the reference map RM1 and invalidates the replicated cache data Ⓐ according to the number of the checked client nodes. Accordingly, the specific distributed cache server CS1 allows the specific client nodes referring to the replicated cache data Ⓐ to delete the replicated cache data Ⓐ stored in their corresponding near cache storage parts. And at the same time, the specific distributed cache server CS1 instructs the specific client nodes to refer to the changed original cache data Ⓐ stored in the main cache storage part if one or more requests for the original cache data A are received, and then instructs the specific client nodes to store the changed replicated cache data Ⓐ corresponding to the changed original cache data Ⓐ in their corresponding near cache storage parts.

Herein, the specific distributed cache server CS1 may perform multicast-based invalidation or unicast-based invalidation according to the number of the checked client nodes referring to the replicated cache data Ⓐ. For example, the specific distributed cache server performs the unicast-based invalidation if the number of the client nodes referring to the replicated cache data Ⓐ is same as or less than a first value and performs the multicast-based invalidation if the number of the client nodes referring to the replicated cache data Ⓐ is greater than the first value. Namely, in case the number of the client nodes referring to the replicated cache data Ⓐ is small, even if the invalidation is performed for each client node, the use of the network resources does not rapidly increase and thus the unicast-based invalidation with a high reliability is performed. On the other hand, in case the number of the client nodes referring to the replicated cache data Ⓐ is large, if the invalidation is performed for each client node, the use of the network resources rapidly increases. Therefore, in case the number of the client nodes referring to the replicated cache data Ⓐ is large, the multicast-based invalidation may be required to prevent the rapid increase of the use of the network resources.

Further, said other original cache data Ⓑ, Ⓒ, Ⓓ, Ⓔ, Ⓕ and said other distributed cache servers CS2, . . . , CSm may also actively perform the invalidation by the above method. Also, when the specific distributed cache server is required to perform the invalidation, the specific distributed cache server may regard said another distributed cache server currently backing up the original cache data Ⓐ as one client node. Accordingly, the specific distributed cache server may update the backup cache data in said another distributed cache server.

Meanwhile, if then number of the client nodes referring to the replicated cache data Ⓐ is very large, the amount of workload consumed for the unicast-based invalidation increases, resulting in a problem that the responsiveness deteriorates. In particular, in case there are hundreds of client nodes, even if the multicast-based invalidation is applied, response signal, i.e., ack signal, should be received from the hundreds of client nodes, and thus sufficient responsiveness cannot be guaranteed. Hence, the distributed cache servers CS1, CS2, . . . , CSm may restrict the number of the client nodes referring to the replicated cache data corresponding to the original cache data to a second number. In this way, an efficiency of referring the replicated cache data may be balanced with an efficiency of performing the invalidation.

Further, if the number of the client nodes referring to the replicated cache data exceeds the second value, the distributed cache server instructs particular client nodes which cause the number of the client nodes to exceed the second value to refer to the original cache data stored in the specific distributed cache server, without allowing the particular client nodes to store the replicated cache data in the near cache storage part.

Next, another method of controlling the near cache will be described below with reference to FIG. 4.

Figure 4:
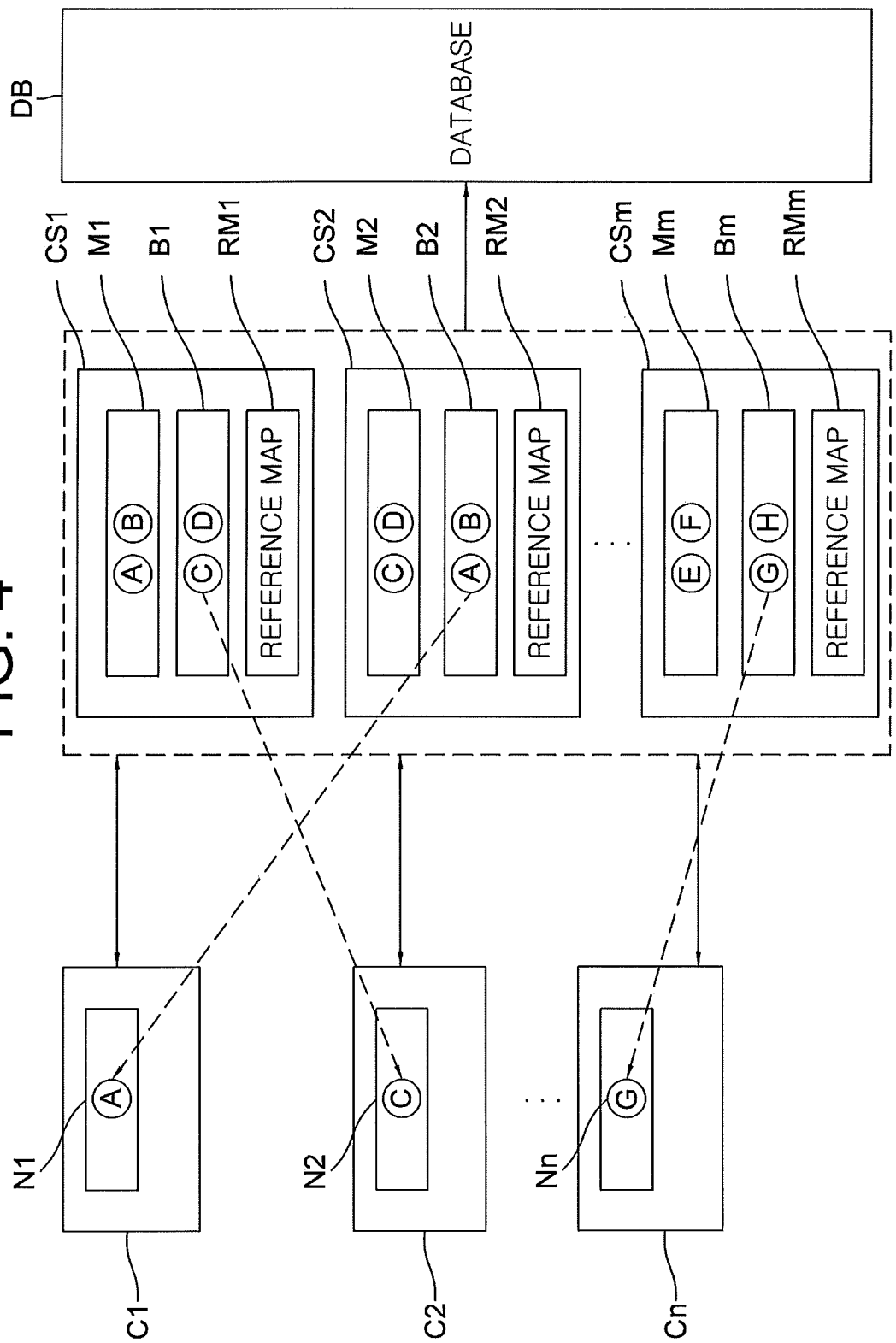
FIG. 4 is a diagram schematically illustrating a distributed cache system in another state that controls a near cache in a distributed cache environment in accordance with one example embodiment of the present invention.

Upon referring to FIG. 4, unlike FIG. 1, on condition that the specific distributed cache server CS1 stores the original cache data Ⓐ in the main cache storage part M1 and stores, in the backup cache storage part B1, backup cache data Ⓒ corresponding to original cache data Ⓒ stored in the main cache server M2 of the distributed cache server CS2, if a request signal for the original cache data Ⓒ is received from at least one client node C2, the specific distributed cache server CS1 transmits replicated cache data Ⓒ for the backup cache data Ⓒ stored in the backup cache storage part B1 to the client node C2.

Then the client node C2 stores, in the near cache storage part N2, the replicated cache data Ⓒ transmitted from the specific distributed cache server CS1, and then the client node C2 does not need to connect to the distributed cache server CS1 or the distributed cache server CS2 for the original data Ⓒ by using the replicated cache data Ⓒ, thereby minimizing the network load.

Further, the specific distributed cache server CS1 generates or updates the reference map RM1 which includes mapping information between the at least one client node C2 referring to replicated cache data Ⓒ stored in the near cache storage part N2 and the backup cache data Ⓒ or supports the distributed cache server CS2 to generate or update the reference map RM2 which includes mapping information between the at least one client node C2 referring to the replicated cache data Ⓒ stored in the near cache storage part N2 and the original cache data Ⓒ.

Thereafter, if the backup cache data is changed, the specific distributed cache server CS1 invalidates the backup cache data according to the number of client nodes referring to the replicated cache data or supports the distributed cache data CS2 to invalidate the replicated cache data according to the number of the client nodes referring to the replicated cache data.

The present invention has an effect of minimizing excessive use of the network resources when cache data are referred to.

The present invention has another effect of efficiently invalidating the cache data in the distributed cache environment according to the number of clients referring to the cache data.

The present invention has still another effect of preventing the rapid increase in the use of the network resources required to invalidate the cache data by the multicast or unicast scheme according to the number of the client nodes in the distributed cache environment.

The present invention has still yet another effect of preventing a rapid increase in the amount of work needed for a single invalidation by managing the number of the client nodes referring to the cache data within an appropriate number in the distributed cache environment.

The objects of the technical solution of the present invention or parts contributing to the prior art can be implemented in a form of executable program command through a variety of computer means and can be recorded to computer readable recording media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high-level code that can be used by an interpreter etc., which is executed by a computer. The aforementioned hardware devices can work as more than a software module to perform the action of the present invention and they can do the same in the opposite case. The hardware devices may be combined with memory such as ROM and RAM to store program commands and include a processor such as CPU or GPU composed to execute commands stored in the memory and also include a communication part for sending and receiving signals with external devices.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A method for controlling one or more near caches in a distributed cache environment which includes a plurality of distributed cache servers, comprising steps of:
   (a) a specific distributed cache server among the plurality of distributed cache servers, when a request signal for original cache data is obtained from at least one client node, (i) generating replicated cache data which is a copy of the original cache data, (ii) transmitting the replicated cache data to the at least one client node, to thereby support the at least one client node to store and refer to the replicated cache data in its corresponding near cache storage part, and (iii) generating a reference map which has mapping information between the at least one client node referring to the replicated cache data and the original cache data, and updating the reference map in response to any change in the mapping information;
   (b) the specific distributed cache server monitoring a changed state of the original cache data included in the reference map, to thereby check a validity of the replicated cache data; and
   (c) the specific distributed cache server, when the replicated cache data is determined as not valid, checking the number of client nodes currently referring to the replicated cache data by referring to the reference map, and invalidating the replicated cache data according to the number of the checked client nodes.

2. The method of claim 1, wherein, at the step of (c), the specific distributed cache server performs multicast-based invalidation or unicast-based invalidation according to the number of the checked client nodes.

3. The method of claim 2, wherein the specific distributed cache server (i) performs the unicast-based invalidation if the number of the client nodes currently referring to the replicated cache data is same as or less than a preset first value and (ii) performs the multicast-based invalidation if the number of the client nodes currently referring to the replicated cache data is greater than the first value.

4. The method of claim 1, wherein, at the step of (a), the at least one client node restricts entire storage capacity of the near cache storage part in which replicated cache data are stored or restricts the number of the replicated cache data stored in the near cache storage part.

5. The method of claim 4, wherein the at least one client node deletes at least one selected among replicated cache data having been referred to at the oldest point of time, replicated cache data having been stored for the longest time, replicated cache data with the smallest capacity and replicated cache data with the largest capacity, in order to restrict the entire storage capacity or restrict the number of the replicated cache data.

6. The method of claim 1, wherein, at the step of (a), the specific distributed cache server restricts the number of the client nodes, referring to the replicated cache data corresponding to the original cache data, to a preset second value.

7. The method of claim 6, wherein, if the number of the client nodes referring to the replicated cache data exceeds the second value, the specific distributed cache server instructs particular client nodes which cause the number of the client nodes to exceed the second value to refer to the original cache data stored in the specific distributed cache server.

8. The method of claim 1, wherein the specific distributed cache server is a distributed cache server currently storing the original cache data among the plurality of distributed cache servers.

9. The method of claim 1, wherein, if the specific distributed cache server is determined as a distributed cache server which stores backup cache data corresponding to another original cache data stored in another distributed cache server, the specific distributed cache server (i) transmits replicated backup cache data for the backup cache data to the at least one client node in response to the request signal for said another original cache data from the at least one client node, (ii) generates or updates the reference map of the specific distributed cache server which has mapping information between the at least one client node referring to the replicated backup cache data and the backup cache data, or supports said another distributed cache server to generate or update another reference map of said another distributed cache server which has mapping information between the at least one client node referring to the replicated backup cache data and said another original cache data corresponding to the replicated backup cache data, and (iii) invalidates the replicated backup cache data in response to a change in said another original cache data.

10. A specific distributed cache server for controlling one or more near caches in a distributed cache environment which includes a plurality of distributed cache servers, comprising:
    a communication part for obtaining a request signal for original cache data from at least one client node; and
    a processor for performing processes of (I) (i) generating replicated cache data which is a copy of the original cache data, (ii) transmitting the replicated cache data for the original cache data to the at least one client node, to thereby support the at least one client node to store and refer to the replicated cache data in its corresponding near cache storage part, and (iii) generating a reference map which has mapping information between the at least one client node referring to the replicated cache data and the original cache data, and updating the reference map in response to any change in the mapping information; (II) monitoring a changed state of the original cache data included in the reference map, to thereby check a validity of the replicated cache data; and (III) when the replicated cache data is determined as not valid, checking the number of client nodes currently referring to the replicated cache data by referring to the reference map, and performing invalidation of the replicated cache data according to the number of the checked client nodes.

11. The specific distributed cache server of claim 10, wherein, at the process of (III), the processor performs to perform multicast-based invalidation or unicast-based invalidation according to the number of the checked client nodes.

12. The specific distributed cache server of claim 11, wherein the processor (i) performs the unicast-based invalidation if the number of the client nodes currently referring to the replicated cache data is same as or less than a preset first value and (ii) performs the multicast-based invalidation if the number of the client nodes currently referring to the replicated cache data is greater than the first value.

13. The specific distributed cache server of claim 10, wherein, at the process of (I), the at least one client node restricts entire storage capacity of the near cache storage part in which replicated cache data are stored or restricts the number of the replicated cache data stored in the near cache storage part.

14. The specific distributed cache server of claim 13, wherein the at least one client node deletes at least one selected among replicated cache data having been referred to at the oldest point of time, replicated cache data having been stored for the longest time, replicated cache data with the smallest capacity and replicated cache data with the largest capacity, in order to restrict the entire storage capacity or restrict the number of the replicated cache data.

15. The specific distributed cache server of claim 10, wherein, at the process of (I), the processor restricts the number of the client nodes, referring to the replicated cache data corresponding to the original cache data, to a preset second value.

16. The specific distributed cache server of claim 15, wherein, if the number of the client nodes referring to the replicated cache data exceeds the second value, the processor instructs particular client nodes which cause the number of the client nodes to exceed the second value to refer to the original cache data stored in the specific distributed cache server.

17. The specific distributed cache server of claim 10, wherein the specific distributed cache server is a distributed cache server currently storing the original cache data among the plurality of distributed cache servers.

18. The specific distributed cache server of claim 10, wherein, if the specific distributed cache server is determined as a distributed cache server which stores backup cache data corresponding to another original cache data stored in another distributed cache server, the processor (i) transmits replicated backup cache data for the backup cache data to the at least one client node in response to the request signal for said another original cache data from the at least one client node, (ii) generates or updates the reference map of the specific distributed cache server which has mapping information between the at least one client node referring to the replicated backup cache data and the backup cache data, or supports said another distributed cache server to generate or update another reference map of said another distributed cache server which has mapping information between the at least one client node referring to the replicated backup cache data and said another original cache data corresponding to the replicated backup cache data, and (iii) invalidates the replicated backup cache data in response to a change in said another original cache data.

* * * * *